June 10, 1952    J. A. BIGGS ET AL    2,599,889
COMPUTER DEVICE FOR NAVIGATION SYSTEMS AND THE LIKE
Filed Sept. 16, 1947    2 SHEETS—SHEET 1
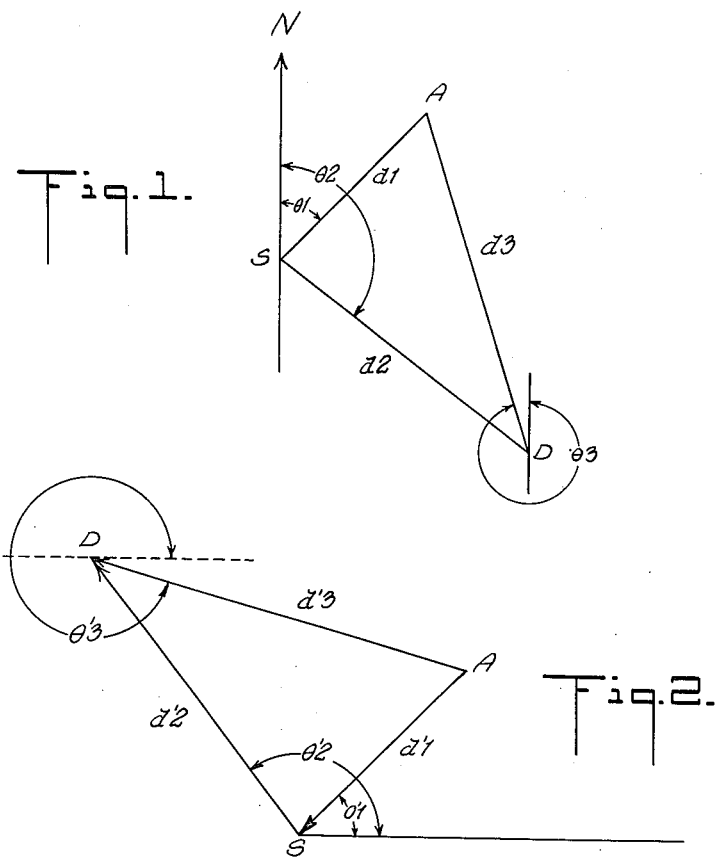
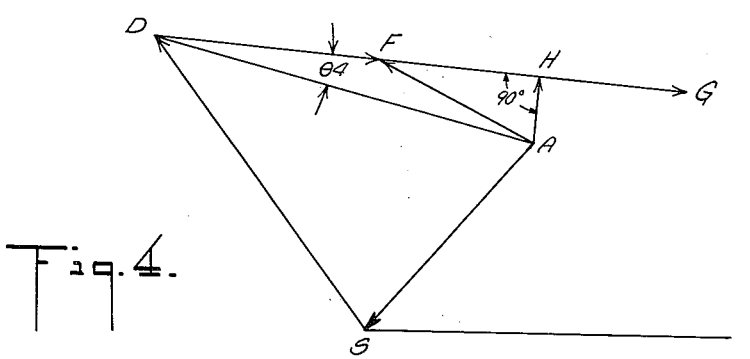
INVENTOR.
JOHN A. BIGGS
FRANCIS L. MOSELEY
EARL T. HEALD
BY John J. Rogan
ATTORNEY

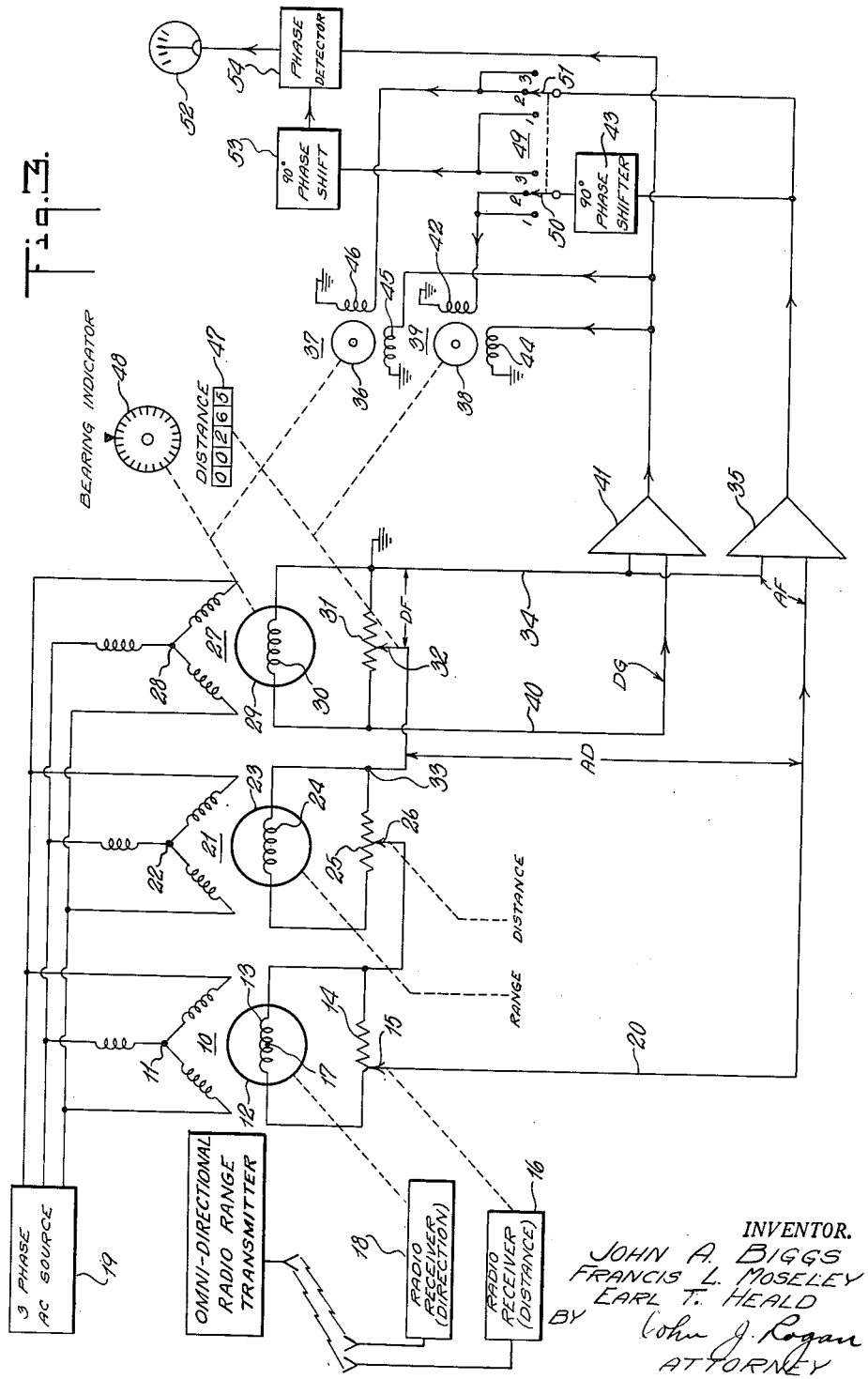

Patented June 10, 1952

2,599,889

UNITED STATES PATENT OFFICE 2,599,889

COMPUTER DEVICE FOR NAVIGATION SYSTEMS AND THE LIKE

John A. Biggs, Earl A. Heald, and Francis L. Moseley, Cedar Rapids, Iowa, assignors to Collins Radio Company, Cedar Rapids, Iowa, a corporation of Iowa Application September 16, 1947, Serial No. 774,304

10 Claims. (Cl. 235—61)

1

This invention relates to navigating arrangements and more particularly it relates to navigation computers, trigonometric computers, and the like.

A principal object of the invention relates to an improved apparatus for automatically computing the bearing of a moving craft with respect to a known point, and also the distance between the moving craft and the said known point.

Another principal object is to provide an automatic bearing and distance computer for use on moving craft for continuously determining the course line and distance to be followed for the craft to reach a desired destination.

Another object is to provide an improved navigational computing mechanism whereby a continuous visual indication is given of the distance between a moving craft and an omnidirectional radio range transmitter, and also a direct visual indication of the bearing of the craft with respect to true north.

A feature of the invention relates to a navigational computer embodying apparatus for electromagnetically setting-up three voltages whose magnitudes and mutually relative phases are automatically controlled by the distance between a moving craft and a radio range transmitter and by the bearing of the craft with respect to said transmitter, in conjunction with means to compare said voltages to produce continuous indications of the distance between the craft and the transmitter, and the bearing of the craft with respect to the transmitter.

Another feature relates to a navigational computer embodying apparatus for setting-up A. C. voltages representing electrical vectors, the length of one vector being proportionate to the distance between a radio range transmitter and the moving craft, the length of a second vector being proportionate to the distance between the said transmitter and the desired destination, in conjunction with means for automatically computing from the said two electrical vectors the vector angle and length of the course between the craft and its destination.

Another feature relates to an arrangement employing two similar units of the synchromotor type for electromagnetically setting-up a pair of vectors representing respectively the orientation of a radio range transmitter with respect to a moving craft and with respect to the craft's desired destination, and a third unit which acts as a vector resolver to control the automatic computation of the vector representing the orientation of the craft with respect to said destination.

2

Another feature relates to an automatic computer for computing the orientation of a moving craft with respect to a desired destination, employing a set of three units each including a synchromotor and an associated adjustable potentiometer for setting-up electrical vectors to produce a resultant electrical vector whose magnitude and relative phase directly determine the bearing of the moving craft with respect to said destination, and the actual distance between the craft and destination.

A further feature relates to a novel organization of apparatus and electrical circuits for solving triangulation problems by electrical vectors.

Other features and advantages not particularly enumerated will appear from the ensuing descriptions and the appended claims.

In the drawing which shows, by way of example, one preferred form of the invention, Fig. 1 is a typical triangulation problem with which the invention is concerned.

Fig. 2 is a vector diagram corresponding to the triangulation of Fig. 1.

Fig. 3 is a schematic wiring diagram of a computing system according to the invention.

Fig. 4 is another vector diagram explanatory of the operation of Fig. 3.

In certain kinds of moving craft, for example airplanes, it is important that there be provided a certain automatic computing mechanism so that the pilot's attention can be exclusively directed towards the handling and maneuvering of the aircraft. Various methods of determining the bearing and distance between the airplane and a desired destination have been proposed, which in the main require considerable plotting or navigational charts and the like. The arrangement according to the present invention is an automatic computer which utilizes information derived from an omnidirectional radio range transmitter to produce automatically a continuous numerical indication of the distance between the airplane and its destination, as well as a direct indication of the bearing of the airplane with respect to true north.

As a typical example of such a navigational problem, there is represented in Fig. 1 by the letter S, any well-known form of radio range transmitter of the omnidirectional type. A typical example of such a system is disclosed in "RCA Review," volume VI, January 1942, number 3, pages 344 to 369. The airplane is assumed to be at the point A, and the destination at the point D. True north is represented in Fig. 1 by the conventional arrow. In Fig. 1, $\theta_1$ is the bearing of the airplane with respect to S; $\theta2$ is the bearing of the destination with respect to S; $d1$ is the distance between transmitter S and the airplane A; $d2$ is the distance between the transmitter S and the destination D; $d3$ and $\theta3$ are the values to be determined, and represent respectively the distance between the airplane A and destination D, and the bearing of the course line between A and D with respect to true north.

In accordance with the present invention, the values $d1$, $\theta1$, $d2$ and $\theta2$ are known, or determinable by suitable signals, and by means of electrical mechanisms the solution for $d3$ and $\theta3$ is effected automatically and continuously as the airplane changes speed and course. To achieve this, the invention makes use of A. C. voltages of variable amplitude, to set up what may be called electrical vectors whose magnitudes represent lengths and whose phase represents bearing. In other words, the space distribution of the electrical vectors is completely analogous to the geometrical lines and angles of Fig. 1. When referred to electrical concepts, these vectors, for the particular example illustrated in Fig. 1, appear as shown in Fig. 2, where the reference axis corresponding to true north is represented as horizontal, and vector rotation is assumed to be in the counter-clockwise direction. In Fig. 2 the various vector lengths and vector angles which correspond to the lengths and angles of Fig. 1 bear the same designations primed. Thus $\theta'1$ is equal to $\theta1$, $d'1$ is a voltage which is proportional to $d1$, $\theta'2$ is equal to $\theta2$, $d'2$ is proportional to $d2$, $\theta'3$ is equal to $\theta3$, and $d'3$ is a voltage proportional to $d3$.

Referring to Fig. 3, there is shown an organization of apparatus for automatically computing the vector $d'3$. In this figure there are shown three similar resolver units each comprising a three-phase synchro motor and an associated adjustable precision potentiometer. Thus the first unit comprises the synchro 10 having a three-phase stator winding 11 with a single phase rotor 12. The winding 13 of this rotor is connected across a potentiometer resistor 14 whose adjustable slider arm 15 is arranged to be automatically set under control of the output of any well-known radio receiving arrangement 16 which produces a signal proportionate to the distance between the airplane and the omnidirectional transmitter S. Since devices of this latter kind are well-known in the radio distance measurement art, detailed description is not necessary herein. Likewise the rotor 12 is arranged to be automatically positioned around its axis 17 to correspond angularly with the direction of the airplane with respect to the source S. For this purpose, any well-known direction-finding radio receiver 18 may be employed, it being understood that the receivers 16 and 18 have respective motor mechanisms in their output circuits which are connected respectively to the members 12 and 15. The three-phase windings 11 of the synchro 10 are supplied with alternating current from the three-phase alternating current source 19. In accordance with the well-known action of synchros there will be developed across resistor 14 a voltage whose phase with respect to a predetermined reference point will vary as the rotary position of rotor 12 is varied. In other words, the A. C. voltage from the winding 13 will, by its phase, represent the angle $\theta1$ (Fig. 2). Therefore, the resultant A. C. voltage applied between conductors 20 and 26, will have a phase and magnitude corresponding to the vector $d'1$ (Fig. 2).

The second resolver unit likewise comprises a synchro motor 21 having a three-phase winding 22 fed from source 19, and a single-phase rotor 23 whose winding 24 is connected across potentiometer resistance 25. The slider arm 26 of this potentiometer is manually set to correspond with the distance between the source S and the destination D. The angular position of rotor 23 is likewise manually set to correspond with the angle $\theta'2$ (Fig. 2). Both of these manual settings can be determined from a map and once they are set, they remain fixed until the conclusion of the flight. It will be understood that the invention is not limited to the automatic setting of the members 12 and 15 and these members may be set manually, if desired, from known position data. Thus, by the two synchro resolver units 10, 21 and their associated precision potentiometers 15 and 26, it is possible to set up an electrical vector system corresponding to vectors $d'1$ and $d'2$ (Fig. 2).

It is now necessary to provide an electrical system which will measure the phase angle and length of the resultant vector $d'3$. In accordance with the invention this is effected automatically by a null hunting system comprising a third synchro resolver 27 having a three-phase stator 28 connected to the three-phase source 19, and a single-phase rotor 29 having a rotor winding 30. Likewise, associated with resolver 27 is a precision potentiometer 31 whose slider arm 32 is connected to point 33. Thus the three potentiometers can be variably connected in series across the conductors 20, 34 which connect to the input circuit of a suitable one-way amplifier 35. For the purpose of controlling the position of rotor 30, it is connected through suitable gearing (not shown) to the rotor 36 of an alternating current motor 37. It will be noted that the rotor winding 30 and potentiometer 31 are connected as by way of conductors 34 and 40 to the input of another one-way amplifier 41. In order that the automatic resolving of the vector $d'3$ may be more clearly understood, reference can be had to the vector diagram of Fig. 4, which is similar to that of Fig. 2, it being assumed that the above-described settings of members 12, 15 and 23, 26 have been effected. The resultant AD is the vector voltage which must be adjusted, by rotation of motors 37 and 39, to a value equal to the vector sum of AS and SD in order to provide the solution for the course line $d3$ (Fig. 1). A vector DG represents the vector voltage which is supplied to amplifier 41, and is equal to the total voltage applied to conductors 34 and 40 from the balancing resolver 27 and its potentiometer 31. The vector DF is a fractional part of this vector DG and is determined by the setting of slider 32. The vector DF is added to vector AD, the latter representing the resultant vector produced by the other two resolver units 10 and 21 and their associated potentiometers. The resultant vector AF is applied over conductors 20 and 34 to amplifier 35.

Amplifier 35 is designed so that it produces sufficient power output to energize the field winding 42 of motor 39, this winding being connected in circuit with a 90° phase shifter network 43. The field winding 44 is connected to the output of amplifier 41 without passing through the network 43. The field winding 45 is likewise connected to the output of amplifier 41, and the field winding 46 is connected to the output of amplifier 35. The motor 39 which drives the slider arm 32, also drives the speedometer-type counting dials of the distance indicator device 47; and the motor 37 which drives the rotor 29 also drives the rotatable bearing dial indicator 48. Both amplifiers 35 and 41 have the same phase shift. Thus it can be assumed that the phase relationship remains as shown in Fig. 4 when a voltage having a phase corresponding to that of DG is applied to windings 44, 45, while amplifier 35 supplied voltage which is in the same phase as AF, to winding 46, and at 90° phase shift to the winding 42. The rotations of motors 37 and 39 are dependent on quadrature components of the voltages applied to their respective field windings. There is an initial voltage and phase angle applied to amplifiers 41 and 35. The electrical signal vectors are applied to the stator windings of motor 37 to cause rotation of rotor 30 until the signal vector applied to amplifier 41 and stator winding 45 is equal to the signal vector applied to amplifier 35 and stator winding 46, and until the phase difference between the said vectors is either 0° or 180°. When this balanced condition is attained, rotation of motor 37 will cease. In the meanwhile, the electrical signal vectors from amplifiers 41 and 35 are applied to the stator windings of motor 39 to cause rotation of arm 32 until the vector DF equals vector AD. However, rotor 13 and contact arm 15 are constantly tracking the craft and hence the signal applied to amplifier 35 will be following this change and will cause motor 39 to constantly operate contact 32 and indicator 41 to indicate distance to the destination. Since the phase outputs of amplifiers 41 and 35 are equal and their phase difference is either 0° or 180°, a 90° phase shift must be interposed between amplifier 35 and stator winding 42 in order that motor 39 continue operating. Thus, looking at Fig. 4, vector DF keeps increasing in magnitude and rotating toward DA while AF decreases in magnitude and rotates toward AD until its magnitude is zero and it is in phase with AD. At this point DF is equal in magnitude and opposite in phase with AD and a balanced condition is attained, and the dials 47 and 48 indicate the distance $d3$ and the bearing of the airplane with respect to the destination D. Regardless of the previous settings of 12, 15 and 23, 26, the motors 37 and 39 have voltages applied to their fields causing them to rotate to reduce the said resultant vector AF to zero. Consequently the dial 47 indicates the actual distance between the aircraft and its destination, and the dial 48 indicates the bearing of the aircraft with respect to its destination regardless of the position and heading of the aircraft.

In the foregoing description it has been assumed that the three-pole double-throw switch 49 has its contact arms 50, 51, on their #2 contacts as shown in Fig. 3. In certain cases it may be desirable to provide an automatic tracking indicator, to indicate the absolute deviation of the airplane from its prescribed course, regardless of the distance of the destination. For this purpose, there is provided a calibrated meter 52 which may be of the movable pointer type and which is arranged to assume a central position when the airplane is flying on course, and is arranged to be deflected to either the right or the left, depending upon the deviation of the airplane from its course. For this purpose, the arms 50, 51, of switch 49 are moved to their #1 contacts. In this position of the switch, the motor 39 is still connected in circuit with the two amplifiers. However the motor 37 is disconnected from the amplifiers and the amplifier 35 is connected through another 90° phase-shifting network 53 to any well-known form of phase detector 54. This phase detector is also supplied with a signal from the output of amplifier 41. The output of the phase detector 54 is applied to the moving coil of the indicating meter 52. The polarity of this phase-detected signal is determined by the direction of deviation of the airplane from its prescribed course. Under these conditions the motor 39 operates continuously to indicate the distance between the airplane and its destination. The deflection of the meter 52 remains constant if the deviation of the airplane is constant, and it is independent of the distance between the airplane and its destination. The reason for this is that the meter deflection is proportional to the vector AH. In other words, the output of amplifier 41 being 180° out of phase with amplifier 35, is applied directly to phase detector 54 while the output of amplifier 35 is shifted in phase by 90° and fed to phase detector 54. The reading of the meter will remain constant as long as the craft is flying on course, but will indicate a deviation only when the craft deviates from the prescribed course causing a shift in phase.

By operating switch arms 50 and 51 to their #3 contacts, the distance-measuring voltage from amplifier 35 is applied to the phase detector and the motor 37 continues to rotate the bearing indicator dial 48. This gives a continuous indication of the course, but the distance-indicating mechanism 47 stays at rest. Under this condition of operation the tracking meter 52 remains centered only when the aircraft is a fixed distance from its destination, thus rendering it possible to effect concentric maneuvering around the destination. This latter feature is of importance since the control tower at the destination could order a plane to proceed around the airport at a fixed distance until such time as traffic would permit a landing, and the pilot has a continuous check on his bearing by means of the continuous rotation of the bearing dial 48. It should be noted that $\theta'3$ in Fig. 2, which represents the said bearing is still capable of rotation when the aircraft moves angularly with respect to the destination. When this occurs the length of AS or the value of $\theta'1$, or both, may change, thus requiring a change in $\theta'3$, even though $\theta4$ is always reduced to zero. In other words, the change in the aircraft direction will change the operation of the device and therefore will require a rotation of the bearing indication; but once a stable condition has been reached the bearing to that destination remains the same in order that the destination may be reached. Thus, bearing indicator 48 rotates only until $\theta4$ equals zero.

While one specific embodiment has been described herein, various changes and modifications may be made therein without departing from the spirit and scope of the invention.

The expression "electrical vector" as employed in the claims means an electrical voltage or current having two components corresponding respectively to the length of the line between one point and a fixed point of origin, for example a radio range transmitter, and to the angle between said line and a fixed base or reference line, for example as the true north bearing line passing through said fixed point.

What is claimed is:

1. Apparatus for indicating the distance between a craft and a desired destination and for determining the bearing of the course line necessary to reach said destination, comprising, a radio beam transmitter whose distance to said destination is known and the bearing between the transmitter and said destination is also known, means to generate a first electrical voltage vector representing the distance betwen the craft and said transmitter and the bearing of the line betwen the craft and the transmitter, means to generate a second electrical voltage vector representing the distance between the transmitter and said destination and the bearing of the line betwen the transmitter and said destination, means for electrically adding said voltage vectors to produce a resultant voltage, means for automatically generating another electrical voltage vector, adjusting means for automatically varying said other electrical voltage vector until it is equal and opposite to said resultant, and means for automatically producing under control of said adjusting means an indication of the distance between the craft and its destination and the bearing of the line between the craft and its destination.

2. Computing apparatus of the kind described comprising, a counter-mechanism for indicating the distance between a craft and its desired destination, a bearing indicator for continuously indicating on the craft the course line that must be followed to reach said destination, a first alternating current motor for operating said counter-mechanism, a second alternating current motor for operating said bearing indicator each of said motors having a pair of windings which are designed to be energized in phase quadrature to effect turning of the motor, a set of three synchros each having a three-phase stator energized from a common three-phase alternating current source, a set of three potentiometers one connected across the rotor of each of said synchros, first and second amplifiers whose output circuits supply said motors, means connecting the said potentiometers in series chain circuit to the input of the first amplifier, means connecting the third potentiometer resistance to the input of the second amplifier, means connecting one winding of the first motor to the output of the first amplifier, means connecting the other winding of the first motor to the output of the second amplifier, means connecting one winding of the second motor to the output of the escond amplifier, and means connecting the other winding of the second motor to the output of the first amplifier through a 90° phase-shifting network, means connecting the rotor of the third synchro unit to the rotor of the first motor and to said bearing indicator, and means connecting the slider arm of the third potentiometer to the rotor of said second motor and to said counter-mechanism.

3. Apparatus for solving triangulation problems such as those encountered in craft navigation wherein the respective lengths of two sides of the triangle are known and the respective angles between said sides and a fixed line such as a true north bearing are known, comprising means to generate a first electric signal voltage whose magnitude represents the length of one known side of the triangle and whose phase represents the bearing angle with respect to said fixed line, means for simultaneously generating a second electric signal voltage whose magnitude represents the length of the other known side of the triangle and whose phase represents the bearing angle with respect to said fixed line, a common circuit to which both of said signal voltages are applied to produce a resultant signal voltage representing the vector addition of said two known sides, means for simultaneously generating a third electric signal voltage having a magnitude representing length and a phase representing bearing angle with respect to said fixed line, means to apply said third signal voltage to said common circuit, means to adjust the magnitude and phase of said third signal voltage until it completely balances said resultant signal voltage, and bearing indicator means and distance indicator means controlled by said adjusting means and in accordance with the setting of said adjusting means.

4. Apparatus for solving triangulation problems such as those encountered in craft navigation wherein the location of two apices of the triangle are known and the third apex represents the location of the craft, and wherein the length and bearing angle of a first line joining the craft and one apex are known, and the length and bearing angle of a second line joining the said two known apices are known, comprising means to set up on the craft a first electric signal voltage with a magnitude and a phase representing respectively the length and bearing of said first line, means for simultaneously setting up on the craft a second electric signal voltage with a magnitude and a phase representing respectively the length and bearing angle of said second line, means for simultaneously setting up on the craft a third electric signal voltage with a magnitude representing length and with a phase representing bearing, a common electric circuit to which the first and second signal voltages are applied to produce a resultant signal voltage representing the vector addition of said two known sides, means for simultaneously applying said third electric signal voltage to said common circuit, respective means to adjust the components of said third signal voltage until said third signal voltage is equal and opposite to said resultant signal voltage, and bearing indicator means and distance indicator means controlled respectively by the settings of said respective adjusting means.

5. Apparatus according to claim 4 in which said first signal is derived from an omni-directional radio transmitter located at said first apex.

6. A computer of the kind described, comprising a first electric vector generating unit having a first synchro with its rotor connected across a first potentiometer resistance, a contact arm for said first potentiometer resistance and arranged to be set to represent a known distance, the rotor of said first synchro being set in accordance with a known bearing to produce at said contact a voltage representing said distance and bearing; a second electric vector generating unit comprising a second synchro having its rotor connected across a potentiometer resistance, a contact arm for said second potentiometer resistance and arranged to be set to represent another known distance, the rotor of said second synchro being angularly set in accordance with another known bearing to produce at the contact of the second potentiometer a voltage representing said second distance and bearing, means interconnecting the first potentiometer resistor and the slider of the second potentiometer resistor to produce a resultant electrical signal voltage representing the vector resultant of the settings of said contacts and rotors; a third electric vector generator unit comprising a third synchro having its rotor connected across a third potentiometer resistance, a contact arm for said third potentiometer resistance, means connecting the second potentiometer resistance to the contact arm of the third potentiometer resistance, means to adjust the contact arm of the third potentiometer resistance to produce a third electrical voltage vector which is equal and opposite to said resultant signal voltage, a first motor for operating the rotor of said third synchro, a second motor for controlling the setting of the contact arm of said third potentiometer, a bearing indicator also operated by said first motor, a distance indicator also operated by said second motor, a first amplifier for controlling the first motor and having its input supplied by the complete voltage developed across said third potentiometer resistor, a second amplifier for controlling the second motor and having its input circuit connected in common to said third potentiometer and to be excited in accordance with the differential between the third voltage and the said resultant signal voltage; and a polyphase source of alternating current connected in parallel to all the rotors of said synchros.

7. A system for continuously indicating on a craft the course and distance which it must travel to reach a fixed destination whose location and bearing are known, comprising a radio range transmitter at a point whose location and bearing are also known, means to receive on the craft from said transmitter a signal representing the bearing of the craft and its distance from said transmitter, means to set up on the craft independently of said transmitter a signal representing the bearing of said destination and its distance from said transmitter, and means to produce on said craft a continuous indication of the distance between the craft and destination and a continuous indication of the bearing of the course between the craft and destination as the craft is approaching said destination; the last-mentioned means including a set of three synchros having their stators energized from a common polyphase alternating current source, one synchro having its rotor angularly adjusted to correspond with the bearing of the craft with respect to the transmitter, the second synchro having its rotor adjusted to correspond with the bearing of said destination with respect to the transmitter, a first voltage-developing circuit connected to the rotor of the first synchro, a second voltage-developing circuit connected to the rotor of the second synchro, a first adjustable element to select from the first circuit a voltage representing the bearing and distance of the craft from said transmitter, a second adjustable element to select from the second circuit a voltage representing the bearing of said destination and its distance from said transmitter, an electrical connection between said two circuits to produce a resultant electric signal which corresponds to the vector sum of said two selected voltages, a third synchro, a third voltage-developing circuit connected to the rotor of said third synchro, a third adjustable element for selecting from said third circuit a third voltage which is equal and opposite to the said resultant, a first motor controlled by the total voltage across said third voltage-developing circuit, a second motor controlled by the differential between said resultant signal and the third voltage, means for operating the rotor of the third synchro from the first motor, means for operating the third adjustable element from said second motor, a bearing indicator coupled to said third rotor and a distance indicator coupled to said third adjustable element.

8. In a system for continuously indicating on a craft as it is moving, the course it must travel to reach a fixed destination and its distance as it approaches said destination, comprising a source of radio range signals located at a point whose distance from said destination is known and whose true north bearing is also known, means to set up on the craft simultaneously three separate continuously varying voltages as the craft approaches said destination, a first voltage having two components respectively representing the distance between the craft and said transmitter and the bearing of the craft as it approaches said destination, the second voltage having two components respectively representing the distance between the transmitter and said destination and the bearing of said destination, the third voltage having respective distance and bearing components, electric circuit means to which the first and second voltages are applied to produce a resultant representing their vector addition, means to apply the third voltage to said circuit to oppose said resultant, means to adjust said third voltage until it is equal and opposite to said resultant, distance indicator means and bearing indicator means coupled to the adjusting means for said third voltage, respective motor means for said bearing indicator means and said distance indicator means, and control circuits for said motors and responsive respectively to the bearing and distance components of said third voltage.

9. A system according to claim 8 in which the bearing indicator motor means is connected to the output of a first amplifier the input of which is connected to said circuit for excitation only by the bearing components of said third voltage, and said distance indicator motor means is connected to an output of a second amplifier the input of which is connected to said circuit for excitation only by the differential between the said resultant and said third voltage.

10. A system according to claim 8 in which the means for setting up said three separate voltages includes three separate synchros each having polyphase stator windings excited by a common polyphase alternating current source and a single phase rotor which is angularly adjustable with respect to the associated stator windings.

JOHN A. BIGGS.
EARL A. HEALD.
FRANCIS L. MOSELEY.

REFERENCES CITED

The following references are of record in the file of this patent:

UNITED STATES PATENTS

| Number | Name | Date |
|---|---|---|
| 2,385,334 | Davey | Sept. 25, 1945 |
| 2,427,463 | Klemperer | Sept. 16, 1947 |
| 2,428,800 | Holden | Oct. 14, 1947 |
| 2,465,624 | Agins | Mar. 29, 1949 |
| 2,467,646 | Agins | Apr. 19, 1949 |

OTHER REFERENCES

Electronic Computers, by Shannon, Electronics, Aug. 1946, pages 110 to 113.